United States Patent
Markgraf et al.

(10) Patent No.: US 9,109,580 B2
(45) Date of Patent: Aug. 18, 2015

(54) ARRANGEMENT FOR FIXING A COMPONENT INSIDE OF A WIND TURBINE

(71) Applicant: SIEMENS AKTIENGESELLSCHAFT, Munich (DE)

(72) Inventors: Adrian Markgraf, Hausham (DE); Joern Olesen, Vejle (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 308 days.

(21) Appl. No.: 13/628,325

(22) Filed: Sep. 27, 2012

(65) Prior Publication Data
US 2013/0081252 A1    Apr. 4, 2013

(30) Foreign Application Priority Data
Sep. 30, 2011   (EP) ...................... 11183523

(51) Int. Cl.
| F03D 11/04 | (2006.01) |
| B23P 11/00 | (2006.01) |
| F03D 11/00 | (2006.01) |
| F16B 19/14 | (2006.01) |

(52) U.S. Cl.
CPC .............. *F03D 11/005* (2013.01); *F03D 11/04* (2013.01); *F16B 19/14* (2013.01); *Y02E 10/728* (2013.01); *Y10T 29/49833* (2015.01); *Y10T 403/471* (2015.01)

(58) Field of Classification Search
CPC ........ F03D 11/005; F03D 11/04; F16B 19/14
See application file for complete search history.

(56) References Cited

U.S. PATENT DOCUMENTS

| 3,480,306 | A | * | 11/1969 | Hsu Yung Shing | 403/281 |
| 3,505,919 | A | * | 4/1970 | Thurner Elmar et al. | 411/440 |
| 4,907,928 | A | * | 3/1990 | Beck et al. | 411/356 |
| 4,948,312 | A | * | 8/1990 | Jochum | 411/5 |
| 4,986,709 | A | * | 1/1991 | Hachtel et al. | 411/30 |
| 5,605,423 | A | * | 2/1997 | Janusz | 411/387.6 |
| 5,730,570 | A | * | 3/1998 | Buhofer et al. | 411/441 |
| 6,436,474 | B2 | * | 8/2002 | Godsted et al. | 427/318 |
| 6,592,313 | B2 | * | 7/2003 | Kohori | 411/402 |

(Continued)

FOREIGN PATENT DOCUMENTS

| DE | 102009055726 A1 | 6/2011 |
| EP | 1472458 B1 | 4/2005 |

(Continued)

OTHER PUBLICATIONS

Hilti Corporation: "Direct Fastening Technology Manual 2011-5. Steel base material", pp. 4.30-4.51, Aug. 2011, XP-002673525; Others; 2011;.

(Continued)

*Primary Examiner* — Rodney Mintz

(57) ABSTRACT

An arrangement for fixing a component inside of a wind turbine is disclosed. The arrangement has a portion of a tower and a direct fastener. The direct fastener has a first part and a second part and the portion of the tower is a portion of a wind turbine tower. The first part of the direct fastener is driven into the portion of the tower and is connected thereto by a combination of friction hold and bonding. The second part of the direct fastener protrudes from the portion of the tower and connects to a component.

15 Claims, 3 Drawing Sheets

(56) References Cited

U.S. PATENT DOCUMENTS

| | | | |
|---|---|---|---|
| 6,713,891 B2* | 3/2004 | Kirkegaard et al. | 290/44 |
| 6,953,300 B2* | 10/2005 | Chen | 403/292 |
| 8,096,084 B2* | 1/2012 | Studebaker et al. | 52/73 |
| 8,186,112 B2* | 5/2012 | Studebaker et al. | 52/204.2 |
| 8,186,122 B2* | 5/2012 | Studebaker et al. | 52/655.1 |
| 8,201,363 B2* | 6/2012 | Studebaker et al. | 52/73 |
| 8,230,657 B2* | 7/2012 | Studebaker et al. | 52/414 |
| 8,245,480 B2* | 8/2012 | Studebaker et al. | 52/655.1 |
| 8,529,178 B2* | 9/2013 | Dayton et al. | 411/386 |
| 8,621,806 B2* | 1/2014 | Studebaker et al. | 52/414 |
| 8,636,456 B2* | 1/2014 | Dayton et al. | 411/387.1 |
| 8,661,755 B2* | 3/2014 | Studebaker et al. | 52/414 |
| 8,950,143 B2* | 2/2015 | Studebaker et al. | 52/414 |
| 2003/0147753 A1* | 8/2003 | Ollgaard | 416/244 A |
| 2009/0188187 A1* | 7/2009 | Studebaker et al. | 52/259 |
| 2010/0218443 A1* | 9/2010 | Studebaker et al. | 52/236.9 |
| 2012/0023864 A1* | 2/2012 | Zheng et al. | 52/782.1 |
| 2013/0115054 A1* | 5/2013 | Yokoyama et al. | 415/126 |
| 2013/0219821 A1* | 8/2013 | Andresen | 52/651.01 |
| 2014/0331568 A1* | 11/2014 | Andersen et al. | 52/40 |

FOREIGN PATENT DOCUMENTS

| | | |
|---|---|---|
| EP | 1623116 B1 | 9/2006 |
| EP | 2078850 A2 | 7/2009 |

OTHER PUBLICATIONS

Hilti Corporation: "Hilti X-BT Threaded Fastener Specification", pp. 1-68, Dec. 2010, XP002673526; Others; 2010.

* cited by examiner

ARRANGEMENT FOR FIXING A COMPONENT INSIDE OF A WIND TURBINE

CROSS REFERENCE TO RELATED APPLICATIONS

This application claims priority of European application No. 11183523.7 EP filed Sep. 30, 2011, which is incorporated by reference herein in its entirety.

FIELD OF INVENTION

The present application relates to an arrangement for fixing a component inside of a wind turbine, wherein the arrangement has a direct fastener. The application further relates to a method for constructing such an arrangement.

BACKGROUND OF INVENTION

Wind turbines comprise support structures to which a nacelle holding a generator and a hub with rotor blades is mounted. The support structures are most commonly tubular towers tapering in both, in wall thickness and in diameter from tower base to tower top. Large wind turbines comprise, in general, tower sections, e.g. with a length of 32.8 to 98.4 feet (10 to 30 meters), and the complete tower can reach heights of more than 328 feet (100 meters).

Often, the towers are steel towers, but concrete towers, concrete bases with steel upper sections and shell towers, are also used.

Inside of a tower, components like ladders or lifts provide access to the nacelle for carrying out service, maintenance and repair work. Furthermore, a wind turbine tower houses power and signal cables for transmitting electric power and signals from the generator and other wind turbine components to different receivers.

Components such as a ladder, guiding rails or ropes of an elevator as well as cable trays have to be fixed to the tower to avoid excessive movement. For this reason multiple mechanical connections between the tower and these components have to be established. Different fastening techniques and fasteners are used.

It is common practice to provide welded connections between a wind turbine tower and a structural component attached to the tower. Nevertheless, the establishment of welded connections is time-consuming and labor-intensive. Exact measurements have to be carried out to locate the welding positions inside the tower. Furthermore, the welds can reduce the structural strength of the tower.

Besides, it is known to establish threaded non through-going holes in a steel tower, into which a bolt can be screwed. However, a sharp tool is needed to thread the holes and during the threading process, small cracks can emerge which under mechanical loads, can extend and decrease the stability of the wind turbine tower.

SUMMARY OF INVENTION

It is an object of the application to provide an arrangement for fixing a component to a wind turbine tower which allows for attaching components firmly to the tower wall or a portion of the tower wall, wherein weakening of the tower structure is avoided or at least reduced compared to arrangements of this kind known in the art. It is a further object of the application to reduce the price of such an arrangement and it is yet a further object of the application to provide a method for constructing such an arrangement.

The aim of the application is achieved by the features of the independent claims. Further aspects of the application are subject of the dependent claims.

The arrangement for fixing a component inside of a wind turbine comprises a portion of a tower and a direct fastener comprising a first part and a second part. The tower is a wind turbine tower. The first part of the direct fastener is driven into the portion of the tower and connected thereto by a combination of friction hold and bonding, and the second part of the direct fastener protrudes the portion of the tower and is connectable to a component. Hence, the arrangement and the method described herein are in that the fastener is inexpensive.

The direct fastener may also be referred to as powder actuated fastener. The depth of penetration of the direct fastener into the portion of the tower is below the thickness of the portion of the tower such that the direct fastener does not penetrate right through the wall. Structural stability problems, hairline or micro cracks and damages to the tower portion due to a through-going hole can be avoided or at least reduced to a minimum.

Besides, a component may be connected firmly to the tower portion, wherein the connection point may be flexibly arranged where ever needed, because a preparation of the surface at the connection point is not necessary, as mentioned above.

An embodiment of the application comprises a direct fastener comprising a first part with a smooth surface in order to further reduce the risk of introducing micro cracks.

Another embodiment of the application comprises a direct fastener with a treated or structured surface of the first part with the aim of enhancing the fit and improving the connection to the tower portion.

According to a further embodiment of the application, the first part of the fastener is zink-coated which leads to a stronger held in the portion of the tower by soldering hold.

The application of a fastener comprising a second part with a cylindrical end, according to an embodiment of the application, further decreases the risk of introducing cracks and of causing damages to the tower. This fastener may be applied to a tower portion made of metal, e.g. steel. Thereby, the fastener is driven into a pre-drilled hole which involves a displacement of material of the tower portion. A part of this material is punched down into the pre-drilled hole, generating high temperatures and causing friction welding. In case of a steel tower portion, additional clamping effects are also superposed due to the elasticity of steel.

According to yet another embodiment, the second part of the fastener comprises an external thread which allows for connecting a component or a suspending element for holding a component by screwing the component or the suspending element to the second part of the fastener.

According to another embodiment of the application, the portion of the tower is made of metal, for instance steel, such that the first part of the direct fastener is held in the portion of the tower, at least partly, by a welding hold. This at least partial fusion of tower portion and fastener increases the loading capacity of the fastener or anchor.

Besides, the fastener is configured to be connected to a component, e.g. by comprising an external thread on its second part.

According to a further embodiment of the application, a component is connected to the second part of the fastener, wherein a dampening and/or spacing element, e.g. a rubber ring, is arranged between the tower portion and the component. Thus, corrosion and damage to the protective paint layer of the tower may further be reduced.

According to yet a further embodiment of the application, at least two fasteners are used, each comprising a first part driven into the portion of the tower and a second part protruding the portion of the tower. A component is connected to the at least two fasteners. Thereby, the tower portion may also comprise at least two tower sections and each of the direct fasteners may be driven into a different one of the sections.

The component may be a ladder, a guiding rail, a rope of an elevator, a cable tray or a part thereof. In case of the component being a ladder, the ladder may be fastened to different tower sections, for instance at least one fastener to each section. The ladder may also be fastened every 6.6 to 9.8 feet (2 to 3 meters) along the tower height. This allows for applying light-weight ladders, e.g. ladders made from aluminium.

A method for constructing an arrangement according to the application comprises determining a position on a portion of the tower. The method further comprises driving the fastener into the portion of the tower at the determined position by a powder actuated tool or a gas actuated tool.

The method demands less time than other comparable methods known in the art. A reason is, for instance, that the surface of the tower portion does not need to be prepared before placing the fasteners.

BRIEF DESCRIPTION OF THE DRAWINGS

The application is described by example in more detail with the drawings. The drawings show configurations and do not limit the scope of the application. The same reference numerals are used in the drawings for elements having the same function.

DETAILED DESCRIPTION OF INVENTION

Figure 1:
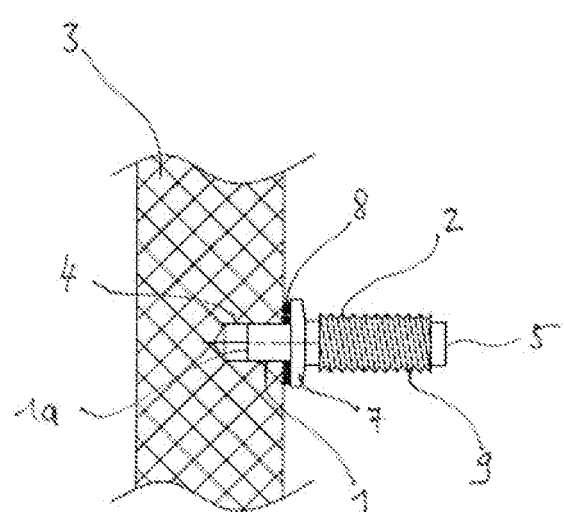
FIG. 1 shows an arrangement according to an embodiment of the application comprising a fastener with a cylindrical end driven into a tower portion.

Referring now to FIG. 1, a schematic view of an arrangement according to an embodiment of the application is shown, wherein the direct fastener 5 is inserted into a portion of a tower 3 by a powder-actuated tool.

In the following, the first part 1 of the fastener 5 is referred to as shank 1 and the second part 2 of the fastener 5 is referred to as bolt 2.

As shown in FIG. 1, the arrangement comprises a fastener 5 with a shank 1 having a cylindrical end portion 1a. The shank 1 comprises a knurling.

The tower portion 3 is made of steel, but could also be made of another metallic material or concrete.

In case of a tower portion 3 made of steel, the steel around the fastener shank 1 is displaced, when driving the shank 1 into the tower portion 3. Thereby, the displaced steel flows back around the shank 1 and into the knurling creating an additional keying hold or in case of a smooth shank 1 only a friction hold. Besides, the heat generated during the driving process, at temperatures of approximately 1652 degrees Fahrenheit (900 degrees Celsius), causes partial fusion of the fastener 5 to the steel. Thus, the fastener 5 is, at least partly, bonded to the tower portion 3.

The fastener 5, shown in FIG. 1, further comprises a stop plate 7. A spacing element 8, is arranged between the tower material 3 and the stop plate 7. Corrosion and damage to a protective paint layer of the tower portion 3 is thus reduced or avoided. The spacing element 8, shown in FIG. 1, is a rubber ring. Other spacing elements could also be used.

Besides, the spacing element 8 provides for dampening and for reducing the structural load and, consequently, for reducing material fatigue. Besides, the tower material 3, a protective layer thereon, e.g. the paint, the stop plate 7 and an attached component (not shown in FIG. 1) are protected against wear. Instead of a rubber ring 8, another element made of a resilient material could be used for dampening.

The spacing and/or dampening element 8 also protects against humidity and other substances, thus avoiding corrosion.

The arrangement, shown in FIG. 1, comprises a fastener 5 with a partly externally threaded 9 bolt 2 for attaching a component thereto by screwing. A nut 12 may be used to fix a component or a part of a component to the threaded bolt 2.

Figure 2:
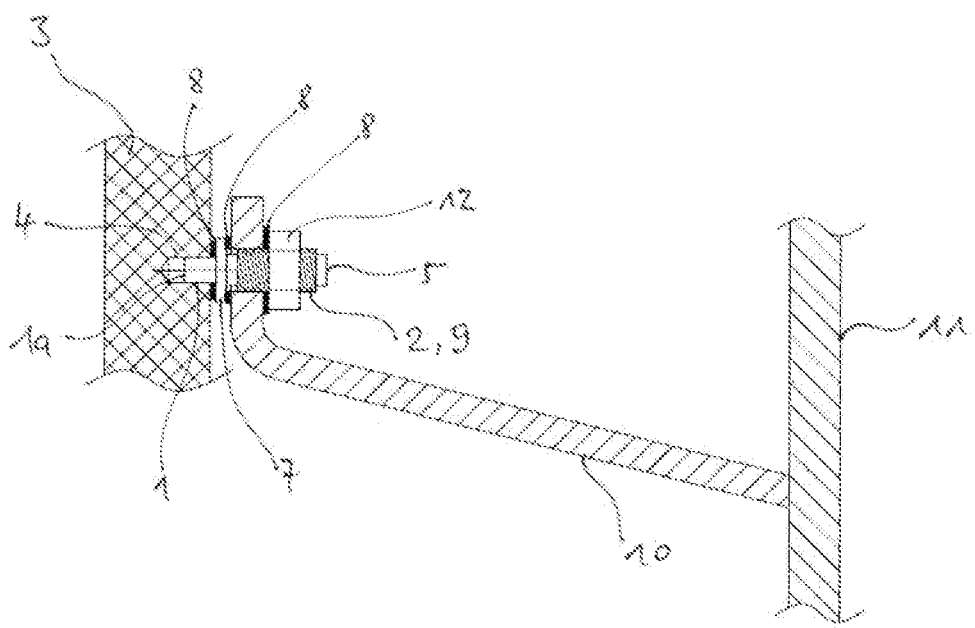
FIG. 2 shows an arrangement according to an embodiment of the application with a component attached thereto.

FIG. 2 shows, by way of example, an arrangement according the application with a part of a ladder 11 attached via a ladder connector 10 to the fastener 5.

The shank 1 of the fastener 5 is fastened in a pre-drilled hole 4 of the tower portion 3, wherein a rubber ring 8 and a stop plate 7 are located on or in close proximity to the surface of the tower portion 3.

The hole 4, drilled in the tower portion 3 before driving the fastener 5 in, may be approximately 0.20 inches (5 mm) deep, wherein the tower thickness is, depending on the height, 16 to 40 mm.

Direct fasteners 5 with a cylindrical shank 1a, i.e. a shank with a blunt tip, may be used on tower materials having a thickness of approximately 0.24 inches (6 mm). Thereby, the diameter of the pre-drilled hole 4 should be slightly smaller than the diameter of the blunt shank, e.g. 0.18 inches (4.5 mm) the hole and 0.16 inches (4 mm) the blunt shank.

As further shown in FIG. 2, a first rubber ring 8, a ladder connector 10, a second rubber ring 8 and a nut 12 are placed next to one another on the bolt 2.

The rubber rings 8 serve as dampener and spacer between the different pieces, e.g. between bolt 2 and ladder connector 10, between ladder connector 10 and tower portion 3, and between stop plate 7 and tower portion 3.

Furthermore, the rubber rings 8 serve as a protection against corrosion in the vicinity of the drilled hole 4 and the hole-fastener interface. Dampening also avoids mechanical stresses and the introduction and extension of micro cracks in the tower 3.

Figure 3:
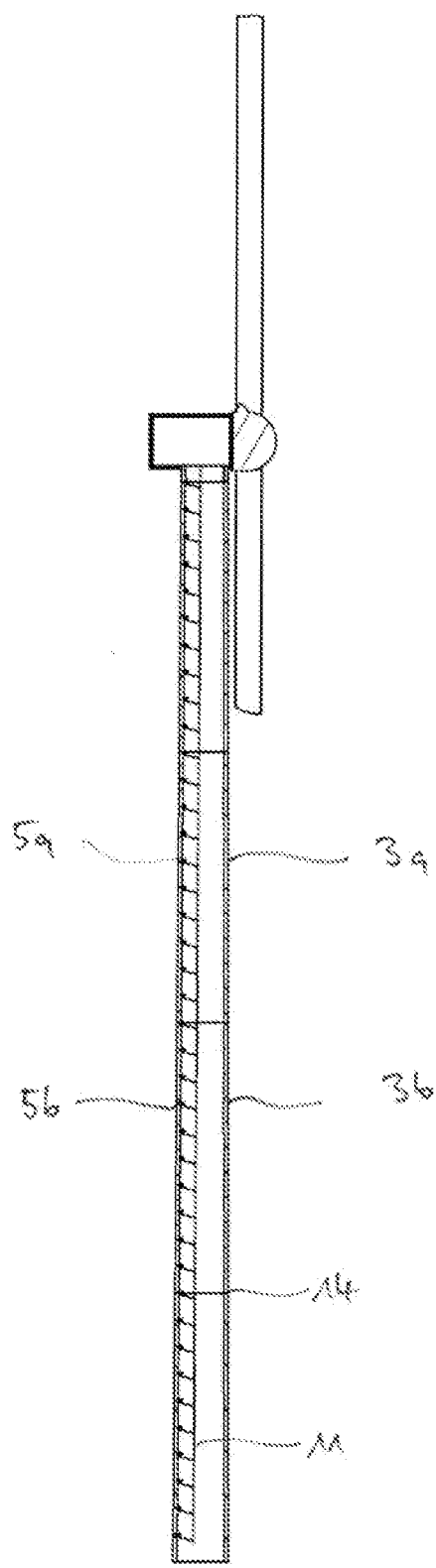
FIG. 3 shows a wind turbine comprising an arrangement according to an embodiment of the application.

FIG. 3 shows a schematically drawing of a wind turbine, the tower 3 of which comprises several sections 3a, 3b. Each section 3a, 3b may have a height of 32.8 to 98.4 feet (10 to 30 meters). A ladder 11 is fastened to the tower 3, such as to each tower section 3a, 3b.

Having the ladder 11 fixed to the tower every 6.6 to 9.8 feet (2 to 3 meters) along the height, a relatively light and flexible aluminium ladder 11 can be used while still avoiding movement, vibration or swinging. Besides, a platform 14 may be mounted between the tower section 3a, 3b.

A method for constructing an arrangement according to the application comprises determining a position on a portion of the tower, the so-called connection point. The method further comprises driving the fastener into the portion of the tower at the determined position by a powder actuated tool or a gas actuated tool.

According to an embodiment of the application, the method may further include drilling a non through-going hole 4 in the portion of the tower 3 before driving the fastener 5 into the portion of the tower 3 and then, driving the fastener 5 into the non through-going hole 4. Thereby, the diameter of the non through-going hole 4 is slightly smaller than the diameter of the shank 1 which is to be driven into the hole 4.

The method for constructing an arrangement according to the application may further comprise inspecting and, when indicated, cleaning the non through-going hole 4 from debris and obstructing particles after having drilling. Furthermore, the method may include attaching a component 10, 11 to the bolt part 2.

The above disclosure is illustrative only and changes may be made in detail, such as in matters of shape, size and arrangement of parts within the principles of the application in the full extent indicated by the meaning in which the appended claims are expressed.

The invention claimed is:

1. An arrangement for fixing a component inside of a wind turbine, comprising:
    a portion of a tower; and
    a direct fastener,
    wherein the direct fastener comprises a first part and a second part,
    wherein the portion of the tower is a portion of a wind turbine tower,
    wherein the first part of the direct fastener is driven into the portion of the tower and is connected thereto by a combination of friction hold and bonding,
    wherein the second part of the direct fastener protrudes from the portion of the tower and connects to the component,
    wherein the first part of the direct fastener is not threaded, and wherein the second part of the fastener comprises an external thread, and
    wherein at least one of a dampening element and a spacing element is arranged between the portion of the tower and the component.

2. The arrangement according to claim 1, wherein the component is a ladder, a guiding rail, a rope of an elevator, or a cable tray.

3. The arrangement according to claim 1, wherein the first part of the direct fastener comprises a cylindrical end.

4. The arrangement according to claim 1, wherein the first part of the direct fastener is surface-treated in order to increase the friction hold.

5. The arrangement according to claim 1, wherein the first part of the direct fastener comprises a structured surface in order to create a keying hold.

6. The arrangement according to claim 1, wherein the first part of the direct fastener is zinc-coated and held in the portion of the tower by a soldering hold.

7. The arrangement according to claim 1, wherein the first part of the direct fastener is at least partly held in the portion of the tower.

8. The arrangement according to claim 1, wherein the portion of the tower is made of metal, and wherein the first part of the direct fastener is held in the portion of the tower by a welding hold.

9. The arrangement according to claim 8, wherein the portion of the tower is made of steel.

10. The arrangement according to claim 1, further comprising:
    at least one further direct fastener,
    wherein the further direct fastener comprises a first part and a second part,
    wherein the first part of the at least one further direct fastener is driven into the portion of the tower and connected thereto by a combination of friction hold and bonding,
    wherein the second part of the at least one further direct fastener protrudes the portion of the tower and is connectable to the component, and
    wherein the component is connected to the direct fastener and to the at least one further direct fastener.

11. The arrangement according to claim 10, wherein the portion of the tower comprises at least two sections, and wherein the direct fastener and the further direct fastener are driven into different sections of the at least two sections.

12. A method for constructing an arrangement, comprising:
    implementing the arrangement according to claim 1;
    determining a position on the portion of the tower; and
    driving the direct fastener into the determined position on the portion of the tower by a tool.

13. The method according to claim 12, wherein the tool is a powder actuated tool or a gas actuated tool.

14. The method according to claim 12, further comprising:
    drilling a non through-going hole in the portion of the tower before driving the direct fastener into the determined position on the portion of the tower,
    wherein driving the direct fastener into the determined position on the portion of the tower comprises driving the direct fastener into the non through-going hole.

15. The method according to claim 12, further comprising attaching the component to the second part of the direct fastener.

* * * * *